United States Patent [19]

Schmidt

[11] Patent Number: 4,938,259

[45] Date of Patent: Jul. 3, 1990

[54] FLUID FLOW CONTROLLER

[75] Inventor: William J. Schmidt, Xenia, Ohio

[73] Assignee: Vernay Laboratories, Inc., Yellow Springs, Ohio

[21] Appl. No.: 298,143

[22] Filed: Jan. 18, 1989

[51] Int. Cl.⁵ ............................................. F16K 17/24
[52] U.S. Cl. ...................................... 138/45; 137/517
[58] Field of Search .................. 138/45; 137/497, 504, 137/517

[56] References Cited

U.S. PATENT DOCUMENTS

| | | | |
|---|---|---|---|
| 2,674,262 | 4/1954 | Bradshaw | 137/517 |
| 2,728,355 | 12/1955 | Dahl | 138/45 |
| 2,781,058 | 2/1957 | Warhus | 138/45 |
| 2,899,979 | 8/1959 | Dahl et al. | 138/45 |
| 3,077,903 | 2/1963 | Honsinger | 138/45 |
| 3,586,040 | 6/1971 | Urback | 137/517 |
| 3,620,500 | 11/1971 | Santomieri | 138/45 X |
| 4,105,050 | 8/1978 | Hendrickson et al. | 137/517 X |
| 4,457,343 | 7/1984 | Zukausky | 138/45 |
| 4,592,390 | 6/1986 | Boyd | 138/45 |
| 4,609,014 | 9/1986 | Jurjevic et al. | 138/45 |
| 4,667,700 | 5/1987 | Buzzi | 137/517 X |
| 4,724,870 | 2/1988 | Molbaek et al. | 138/46 |

Primary Examiner—Stephen M. Hepperle
Attorney, Agent, or Firm—Biebel, French & Nauman

[57] ABSTRACT

A flow control for controlling the rate of flow of a fluid through a flow passage over a range of varying line pressures resembles a Belleville washer and is molded from a thermoplastic elastomer having a hardness range from 40 Shore A to 50 Shore D. The control has a circumferential outer rim and a dome-shaped contour within the rim which provides an apex, a concave downstream surface and a convex upstream surface, with the fluid flow passage extending through its apex. This flow control does not require interaction with a specifically designed seat but can simply be mounted across the flow passage which it is to control by retaining its rim portion upstream from the flow passage to be controlled.

8 Claims, 1 Drawing Sheet

FLUID FLOW CONTROLLER

BACKGROUND OF THE INVENTION

Devicees for controlling the rate of flow of a fluid, primarily but not necessarily a liquid, to provide a substantially constant flow rate over a range of varying line pressures, are utilized in a wide variety of applications. Typical examples, which are by no means all inclusive, are beverage dispensers, automatic washing machines for clothes or dishes, water softeners, hydraulic and pneumatic systems, automotive fuel injection, gas valves, pneumatic machine tools and respiratory controls.

One type of flow control which has been found effective over this wide variety of installations is a centrally apertured rubber washer, which can be routinely engineered to maintain a constant flow rate over a limited range of variations in line pressure. Regardless of the specific application, generally such a flow control washer is designed by specifying an elastomeric material having a requisite modulus of elasticity, thickness, diameter, contour and flow aperture diameter to give the desired rate of flow over the range of supply pressures likely to be encountered in the specific application for which the flow control is needed.

Thus in a typical application according to conventional practice, the flow control is an essentially flat rubber washer having a centrally located flow passage of circular section, which may be countersunk at its downstream end or both ends. In operation, this washer will remain in substantially unstressed condition at the lower end of the supply pressures for which it is designed. If, however, the pressure rises, the washer will bow or deflect in the flow direction, and the resuling distortion will reduce the effective flow area of the flow passage therethrough.

As noted, each flow control of this type is effective over a limited range of inlet pressures, which is taken into consideration, according to the skill of the art, in designing each such control. However, co-owned Jurjevic et al. U.S. Pat. No. 4,609,014 discloses a flow control assembly which includes a control washer and means for changing the nominal flow rate for a range of flow pressures.

Conventionally, washers of this type are used with a seat of rigid material, metal or plastic, which coacts with the washer to provide the desired flow rate, usually by interaction of the flow washer with a specific seat shape. Thus it is a common procedure to design both the properties of the flow control washer and the contour of the seat with which it is to interact to obtain the flow charactertistics required for a specific installation.

While flow controls constructed of thermoset rubber are extremely versatile with respect to the broad range of applications, as noted above, in which they are utilized, it should be noted that scrap or reject rubber material cannot be simply reprocessed, but is usually simply discarded, thereby necessarily affecting the price of the usable rubber flow controls.

SUMMARY OF THE INVENTION

The primary object of the present invention is to provide a flow control generally of the above type but one which can be manufactured of a recyclable material and which does not require a specially configured seat on its downstream side with which it must interact in operation.

This object is achieved in accordance with the invention by fabricating a flow control washer from an elastomeric material selected from a class of newly developed materials known as thermoplastic elastomers or thermoplastic rubber. Materials of this class generally have a higher modulus of elasticity and hardness than is considered useful for elastomeric flow control devices of the above type. However, it has been discovered in accordance with the present invention that despite this apparent unsuitability for flow control usage, flow control devices can in fact be formed of thermoplastic elastomers or thermoplastic rubber by constructing the flow control to a particular and unique configuration.

More specifically, a typical flow control in accordance with this invention can be described generally as having a domed shape resembling a Belleville washer in its proportions and configuration rather than conventional flow control washers. In other words, a flow control in accordance with the invention is relatively thin and also dome or bowl shaped to provide an apex which is normally displaced from the plane of the rim of the device by a distance equal to a multiple of the thickness of the device. As a result of these dimensions and despite the limited modulus of hardness characteristic of thermoplastic elastomers, the flow control of the invention can be mounted with only its rim being held, and it still will deflect through only a limited range as the supply pressure varies and cannot be turned inside out even if the supply pressure increases to a much greater extent than anticipated.

Additionally, unlike thermoset rubber flow controls, the seat for a thermoplastic elastomer flow control in accordance with the present invention need not be of any special configuration, but need only retain the flow control in place while permitting axial movement thereof.

It will also be seen that once the problem of unsuitability for flow controls of the harder thermoplastic elastomers and rubbers is overcome by redesign of the product configuration, the additional property of these materials, their recyclability, becomes an additional advantage.

Other objects and advantages of the invention, and the means by which the invention achieves and provides them, will be pointed out or apparent from the description of the preferred embodiment which follows.

DESCRIPTION OF THE PREFERRED EMBODIMENTS

Figure 1:
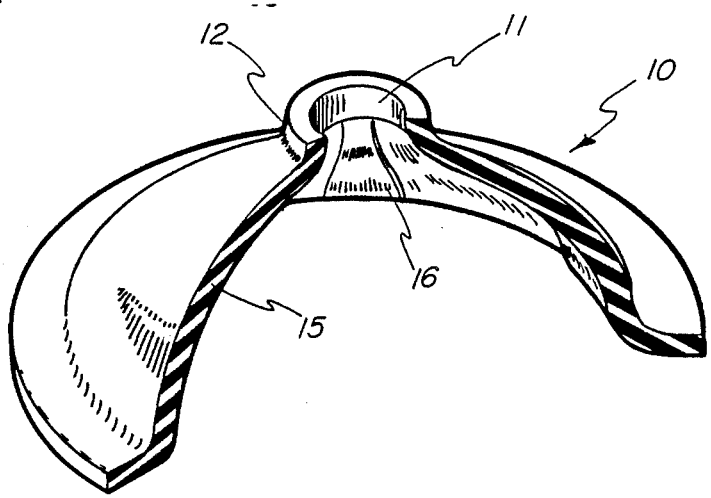
FIG. 1 is a view in perspective, partly broken away, illustrating a typical flow control in accordance with the invention.

The flow control washer 10 is an annular member of thermoplastic elastomeric material having a dome shaped contour. A flow passage 11 of circular section extends through the apex of washer 10 and is surrounded at its upstream end by an extended tubular lip portion 12. The circumferential outer rim 13 is essentially flat, and the dome shaped wall 15 which is shown as of substantially the same thickness as the rim 13, flares upwardly from the inner periphery of the rim 13 to the flow passage 11 so that the overall outline of the flow control 10 is similar to that of a bowl or a Belleville washer, with the axial dimension of the interior thereof between the passage 11 and the radial plane defined by the rim 13 being substantially greater than the thickness of the wall 15.

Optionally, the wall 15 may include integrally molded stiffening ribs 16 radiating from the flow passage 11 in circumferentially spaced relation on the concave side of the wall 15. As shown in FIG. 1, each rib 16 is preferably tapered in width from its narrowest portion adjacent the flow passage 11, and its preferred thickness is determined by the hardness of the elastomeric material and the overall size of the flow control washer.

Figure 2:
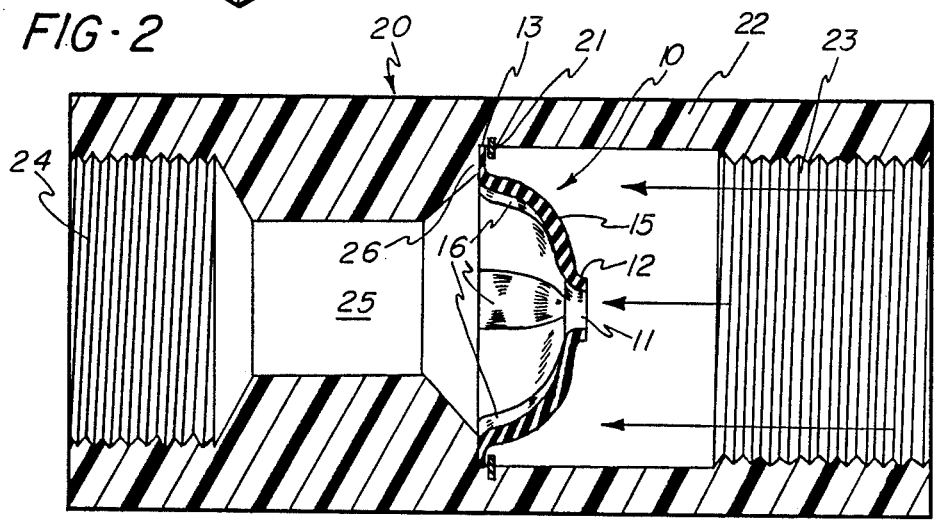
FIG. 2 is a sectional view through a valve assembly which includes a flow control as shown in FIG. 1, and specifically illustrating the operation of the flow control when the supply pressure is low.
Figure 3:
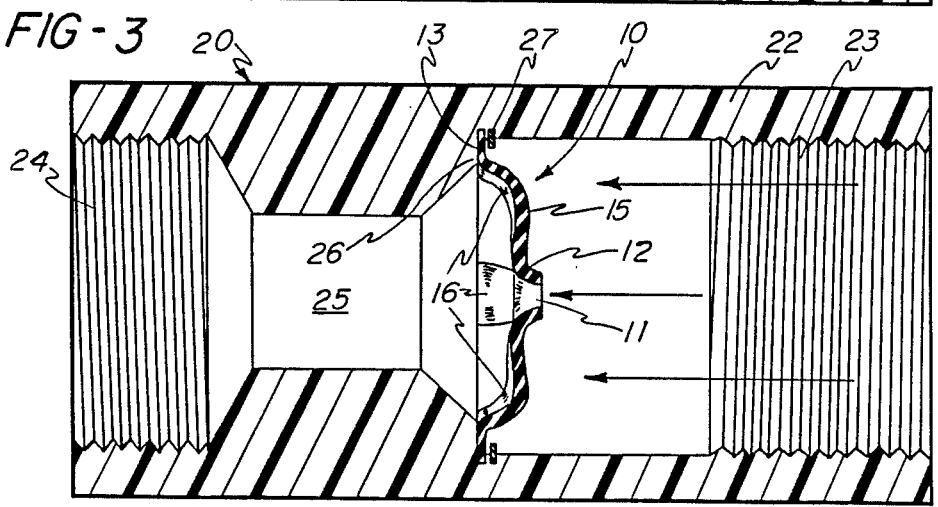
FIG. 3 is a view similar to FIG. 2 illustrating the response of the flow control to high supply pressure.

The use and operation of the flow control 10 is illustrated in FIGS. 2 and 3, which show a valve assembly 20 in accordance with the invention for controlling the rate of flow of fluid from a supply line to a delivery line over a range of supply pressures. The valve assembly 20 includes a valve body 22, which may be of metal or molded plastic material, and which includes a through-flow passage threaded at its upstream end 23 for connection to a supply line and at its downstream end 24 for connection to a delivery line.

The two threaded ends of the valve body 22 are connected by a through flow passage 25 having a shoulder 26 at the upstream end thereof which faces the upstream end 23. The shoulder 26 forms a support for the rim 13 of a flow control washer 10 positioned with its convex side facing upstream, and the assembly is completed by a snap ring 27 which holds the rim 13 between itself and the shoulder 26. Alternatively, the rim 13 could be confined between a pair of snap rings, or it could be retained in a slot in the same manner as the snap ring 27.

FIG. 2 illustrates the operating position of the flow control 10 when the supply pressure of the fluid entering through the connection 23 is of a sufficiently low level to cause no distortion of the dome portion 15 of the flow control 10. Under these conditions, the effective flow area through the passage 11 at the apex of flow control 10 will be the same as if the flow control were not in use, which is considered at the "normal" condition as that term is used herein in the claims.

FIG. 3 illustrates conditions within the valve body 22 when the supply pressure has increased sufficiently to overcome some of the inherent resistance of flow control 10 to distortion in the downstream direction. If the increase is relatively low, the result will usually be simply to compress the lip portion 12 into constricting the flow area through passage 11. At high pressures, the dome wall 15 will be compressed, as shown, and this will inherently reduce the effective flow area through the passage 11, with the extent of the distortion and flow area reduction depending upon the extent of the increase in supply pressure.

It is important to note, however, that the proportions and modulus of hardness of the flow control 10 are such that when it is in service as illustrated in FIGS. 2 and 3, it cannot be distorted to the extent that it will turn inside out, or that its apex portion 12 can otherwise be forced into the radical plane defined by its rim 13. As a result, there is no reason to provide the valve assembly with a special seat for interaction with the flow control 10, because the latter cannot be distorted to such extent that any portion of it other than its rim 13 can come into contact with a seat in or downstream from the radial plane of the shoulder 22.

As already pointed out, the key to the success of the present invention lies in forming the flow control 10 of a thermoplastic elastomeric material of a particular configuration, which enables the much harder materials of this type to function as described above in connection with FIGS. 2 and 3. More specifically, it has been found that in contrast to the relatively low modulus of hardness of rubbers of the type conventionally used in the manufacture of flow control washers, a flow control 10 can be successfully produced and used even though it is molded of a thermoplastic elastomer having a hardness range from 40 Shore A to 50 D, which is a material heretofore considered unsuitable for devices of this type.

One thermoplastic elastomer or rubber suitable for the present invention is vulcanized polyolefinic material in which fully cured rubber particles of one micron or less are dispersed throughout a continuous matrix of thermoplastic material. Such materials is sold by Monsanto Company under the trademark SANTOPRENE.

In addition to possessing the desired characteristics of elasticity and hardness, thermoplastic elastomerics offer very practical advantages for the practice of the present invention in that the techniques required for molding them are much simpler than the molding of rubber, particularly in that no cure is needed. Also, any scrap produced during the molding operation is fully reusable, since it may be remelted as part of a subsequent batch of material to be molded, whereas the scrap from rubber molding operations constitutes waste.

While the hardness and elastically properties of thermoplastic rubbers would, by conventional thinking, constitute a disadvantage to their use for flow controls, by virtue of the present invention, these same properties are in fact utilized to advantage. More specifically, while flow controls produced in accordance with the prior art from natural and synthetic rubbers need to interact with complementary rigid seats on their downstream side, a dome shaped flow control which can be molded from thermoplastic elastomers operates independently of a valve seat so long as its rim is supported and provision is made for vertical movement of the flow control. In addition, it is possible and practical to produce dome shaped flow controls in accordance with the invention which are of considerably less thickness than a rubber washer designed to provide the same flow controlling properties, and therefore require correspondingly less material.

As a specific example, a typical rubber flow control washer for providing a desired flow rate through a flow passage having a normal diameter of 0.015 inch is 0.300 inch in diameter and 0.150 inch in thickness, and it also requires a specially configured valve seat in the valve assembly. In contrast, a flow control in accordance with the invention, having the same outer diameter and flow passage, need be only about 0.040 inch in thickness, but its total axial dimension, from the apex 12 to the downstream side of the rim 13 will be approximately 0.0350 inch.

As further illustration of the capabilities of the flow control washers of the invention, they can be used to control flow over a range of pressures from 5 psi to 150 psi while maintaining essentially the same relative dimensions illustrated in the drawing and as noted in the preceding paragraph.

For example, conventional flow controls having outer diameter in the range of 0.300 to 0.500 inch require a thickness in the range of 0.120 inch to 0.200 inch, and for outer diameters in the range of 0.750 inch to 1.000 inch, the thickness should be from 0.150 inch to 0.300 inch. In contrast, the flow controls of the invention need have a thickness of only from 0.040 inch to 0.100 inch for outer diameters over a range as large as 0.250 inch to 2.00 inches.

As illustrated in FIGS. 2 and 3, one result of these dimensional relationships is that the linear distance from edge to edge across an axial section through the flow control 10, measured along either its upstream or downstream surface, and with or without inclusion of the diameter of the flow passage 11, is substantially greater than the outer diameter of its rim 12. The combination of these dimensions and the properties of hardness and elasticity possessed by thermoplastic elastomers enables the dome shaped wall 15 to be distorted over a substantial distance axially of the flow passage 11, with resulting variation of the flow area through the passage 11 as needed to maintain a constant flow rate. However, the proportions and hardness of this flow control 10 are still such that its apex 12 will not reach the plane of the rim 13, and in no case can be turned inside out, thereby eliminating the need for a valve seat on the downstream side of this flow control.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A flow control for regulating the flow of liquid in one direction between two aligned upstream and downstream passages, comprising:
   (a) an annular member of elastomeric material having predetermined upstream and downstream sides,
   (b) said downstream side including a circumferential rim defining a plane extending substantially radially of said member and surrounding an opening of relatively large flow area,
   (c) said downstream side of said member including an apex having a flow passage extending axially therethrough which is of predetermined substantially smaller normal flow area than said opening surrounded by said rim,
   (d) a bowl-shaped wall interconnecting said rim and said apex and having a convex upstream outer surface and a concave downstream inner surface cooperating to provide said member with a bowl-shaped contour in radial section, and
   (e) said wall being of substantially less thickness than the axial distance between said apex and said plane defined by said rim whereby fluid pressure applied against said upstream surface of said wall will result in deflection of said wall causing axial movement of said apex toward said plane and reduction of the flow area of said fluid flow passage through said apex.

2. A flow control as defined in claim 1 wherein the axial dimension of said member from the upstream end of said apex to the downstream side of said rim is at least three times the thickness of said bowl-shaped wall.

3. A flow control as defined in claim 1 wherein said annular member further comprises stiffening ribs integrally molded with said concave surface of said bowl-shaped wall in radiating relation with said flow passage and circumferentially spaced relation with each other.

4. A flow control as defined in any of claims 1-2 wherein said member is composed of a thermoplastic elastomer having a hardness range from 40 Shore A to 50 Shore D.

5. A valve assembly for controlling the rate of flow of fluid from a supply line to a delivery line over a range of supply pressures, comprising:
   (a) a valve body having therein coaxial upstream and downstream passages adapted for connection to a supply line and a delivery line respectively,
   (b) means forming an annular shoulder facing upstream in said valve body adjacent the upstream end of said downstream passage and defining an opening at least equal in flow area to said downstream passage,
   (c) a flow control positioned within said valve body between said passages and comprising an annular member of elastomeric material having predetermined upstream and downstream sides,
   (d) said downstream side including a circumferential rim defining a plane extending substantially radially of said member and of substantially the same dimensions as said shoulder,
   (e) said annular member also including a bowl-shaped wall extending upstream from said rim and having a coonvex upstream outer surface and a concave downstream inner surface cooperating to provide said member with a bowl-shaped contour in radial section,
   (f) said upstream side of said member including an apex having a flow passage extending axially therethrough which is of predetermined substantially smaller normal flow area than the inner periphery of said rim,
   (g) means supporting said rim on said seat in said valve body with said convex side of member facing said upstream passage, and
   (h) said wall being of substantially less thickness than the axial distance between said apex and said plane defined by said rim whereby fluid pressure applied against said convex surface will result in deflection of said bowl-shaped wall and axial movement of said apex toward said shoulder to cause reduction of the flow area of said fluid flow passage through said apex.

6. A valve assembly as defined in claim 5 wherein the axial dimension of said annular member from the upstream end of said apex to the downstream side of said rim is at least three times the thickness of said bowl-shaped wall.

7. A valve assembly as defined in claim 5 wherein said annular member further comprises stiffening ribs integrally molded with said concave surface of said bowl-shaped wall in radiating relation with said flow passage and circumferentially spaced relation with each other.

8. A valve assembly as defined in any of claims 5-7 wherein said member is composed of a thermoplastic elastomer having a hardness range from 40 Shore A to 50 Shore D.

* * * * *